US007225409B1

(12) United States Patent
Schnarel et al.

(10) Patent No.: US 7,225,409 B1
(45) Date of Patent: May 29, 2007

(54) GRAPHICAL USER INTERFACE FOR A SCREEN TELEPHONE

(75) Inventors: Charles P. Schnarel, Woodinville, WA (US); Mauricio Lomelin, Redmond, WA (US); Peter G. Chin, Seattle, WA (US); Derek S. Graham, Seattle, WA (US); Kate Welker, San Francisco, CA (US); Robert C. Murdock, Oakland, CA (US); Suzanne Walsh, San Francisco, CA (US); Justin Cooper, Oakland, CA (US); Laurence Golding, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/383,038

(22) Filed: Aug. 25, 1999

Related U.S. Application Data

(60) Provisional application No. 60/098,187, filed on Aug. 26, 1998, provisional application No. 60/122,975, filed on Mar. 3, 1999.

(51) Int. Cl.
*H04M 1/56* (2006.01)
(52) U.S. Cl. ...................... 715/747; 715/751
(58) Field of Classification Search ............... 345/752, 345/755, 753, 754, 756, 757, 758, 759, 715, 345/808–809, 719–720, 734–736, 771–773, 345/778, 779–780, 786–787, 744–747, 173–176, 345/863, 864; 707/10, 513; 379/200–201, 379/142.01, 142.15, 142.17, 201.03; 710/302–304; 709/328, 331, 217, 202, 203, 227, 218; 715/744–747, 715/771–773, 748–749, 802, 804, 805
See application file for complete search history.

(56) References Cited

U.S. PATENT DOCUMENTS 5,455,854 A    10/1995    Dilts et al.
5,533,110 A    7/1996     Pinard et al.
5,619,684 A *  4/1997     Goodwin et al. ............. 710/62
5,657,378 A    8/1997     Haddock et al.
5,689,708 A *  11/1997    Regnier et al. ............. 709/229
5,724,412 A    3/1998     Srinivasan (Continued)

FOREIGN PATENT DOCUMENTS

WO    WO 96/02409    1/1996

OTHER PUBLICATIONS

*CIDCO and Sun Announce Licensing Agreement Intended to Create New Consumer Internet Appliances Based on JavaOS for Consumers™ Software*, Sun Press Releases, Apr. 13, 1998, http://www.sun.com/javaos/consumers/press4.98.html printed from the Internet Feb. 16, 1999.

(Continued)

*Primary Examiner*—Steven P Sax

(57) ABSTRACT

A graphical user interface for a web telephone and other telephony devices provides a unique combination of display elements that provide information and enable the user to access functionality of the device. The display elements include customizable screen areas called panes, an application program selection area, and call state area for displaying telephone line status information. A software platform of the user interface provides a set of default user interface features and exposes an application programming interface. System implementers may customize the default display elements or create entirely new custom panes that fit within a uniform user interface framework using the application programming interface.

41 Claims, 7 Drawing Sheets

U.S. PATENT DOCUMENTS

| | | | |
|---|---|---|---|
| 5,754,636 A | | 5/1998 | Bayless et al. |
| 5,799,068 A | | 8/1998 | Kikinis et al. |
| 5,802,304 A | * | 9/1998 | Stone .......................... 709/227 |
| 5,850,433 A | * | 12/1998 | Rondeau ................ 379/218.01 |
| 5,877,695 A | * | 3/1999 | Kubes et al. ............ 340/815.4 |
| 5,974,468 A | | 10/1999 | Taylor et al. |
| 6,009,469 A | | 12/1999 | Mattaway et al. |
| 6,014,137 A | * | 1/2000 | Burns ......................... 345/747 |
| 6,035,019 A | | 3/2000 | Hara |
| 6,049,334 A | * | 4/2000 | Bates et al. .................. 345/744 |
| 6,091,808 A | | 7/2000 | Wood et al. |
| 6,134,017 A | | 10/2000 | Schlank et al. |
| 6,151,620 A | * | 11/2000 | Madsen et al. .............. 709/204 |
| 6,178,432 B1 | | 1/2001 | Cook et al. |
| 6,192,118 B1 | * | 2/2001 | Bayless et al. |
| 6,208,879 B1 | * | 3/2001 | Iwata et al. .................. 345/864 |
| 6,268,924 B1 | * | 7/2001 | Koppolu et al. ........... 358/1.13 |
| 6,331,864 B1 | * | 12/2001 | Coco et al. .................. 345/763 |
| 6,334,157 B1 | * | 12/2001 | Oppermann et al. ........ 719/310 |
| 6,389,124 B1 | * | 5/2002 | Schnarel et al. ....... 379/142.01 |
| 6,429,882 B1 | * | 8/2002 | Abdelnur et al. ............ 345/763 |
| 6,469,713 B2 | * | 10/2002 | Hetherington et al. ...... 345/740 |
| 6,496,202 B1 | * | 12/2002 | Prinzing ...................... 345/762 |
| 6,496,578 B1 | * | 12/2002 | Chen et al. ............. 379/211.02 |
| 6,504,555 B1 | * | 1/2003 | Slupe et al. .................. 345/762 |
| 6,516,202 B1 | * | 2/2003 | Hawkins et al. .......... 455/556.2 |
| 6,611,878 B2 | * | 8/2003 | De Armas et al. ........... 719/328 |
| 6,675,204 B2 | * | 1/2004 | De Boor et al. ............. 709/217 |
| 6,678,365 B1 | * | 1/2004 | Kinoshita .............. 379/201.01 |
| 6,711,645 B1 | * | 3/2004 | Chari et al. .................. 710/302 |
| 6,735,208 B1 | | 5/2004 | Riemann et al. |
| 6,975,712 B1 | * | 12/2005 | Schnarel et al. ....... 379/142.01 |
| 2006/0015819 A1 | * | 1/2006 | Hawkins et al. ............. 715/780 |

OTHER PUBLICATIONS

*Telephones & Equipment,* CST 2100 Corded Screenphone, http://www.swbell.com/ printed from the Internet Feb. 10, 1999.

*AT&T Personal Communications Center User Guide,* Graphics © AT&T 1995.

*Teleport, Teleport 33.6 Speakerphone Edition User's Guide,* Global Village Communication, 1144 East Arques Ave., Sunnyvale, CA 94086, 1996.

CIDCO iPhone Screen Phone, http://www.cidco.com/iphone/intro2.html printed from the Internet Feb. 10, 1999.

One Touch ™ Alcatel Internet Screenphone, http://www.alcatel.com/telecom/mbd/products/products/detailed/term/otouch.htm printed from the Internet Feb. 16, 1999.

*Technical Specs, Alcatel Internet Screenphone,* http://www.alcatel.com/telecom/mbd/products/products/detailed/term/tech.htm, printed from the Internet Feb. 16, 1999.

*Alcatel's Internet Screenphone Based on Sun's PersonalJava ™ and JavaOS for Consumers ™ Wins CeBIT Oscar Best Communications Product 1998,* http://www.sun.com/javaos/consumers/oscar98.html printed from the Internet Feb. 16, 1999.

"Uniden's Axis Telephone Terminal," p. 1-2, http://www.uniden.com/au.

"Alternative Web Access Via TV and Telephone," p. 1-4, http://pimall.com/nais/n.ephon.html.

"This is the *Cordless Version* of Your Mother's Email Machine," p. 1-2, http://www.telephone-guys.com/axis2.htm.

"Powertouch 350 Kit Charcole Specification," p. 1, http://www.gy.com/spec/uxaj.htm.

"Northern Telecom PowerTouch 350," p. 1-2, http://www.commsource.com/ntpt350.html.

"BellSouth Telephone Products," p. 1-3, http://www.bellsouth.com/blsc/maestro.html, 1997.

"PowerTouch," p. 1, http://ltlcs.gte.com/power.htm.

"PowerTouch Specifications," p. 1-3, http://ltlcs.gte.com/ptspec.htm.

"PowerTouch Phones," p. 1, http://widts.gte.com/Shopping/pwrtch.htm, 1999.

"Press Releases Archive, Jan. 9, 1997," p. 1-2, http://www.news.philips.com/archief/199701092.html, Jan. 9, 1997.

"Tek Discount Warehouse," p. 1-2, http://www.discountwarehouse.com/tekgallery/norpow350.html.

Teleport 33.6 Speakerphone Edition, User's Guide, pp. I-105, Global Village Communication, Inc. 1996.

CIDCO iPhone- Introduction, p. 1, http://www.cidco.com/iphone/intro2.html, visited on Feb. 10, 1999.

CIDCO iPhone- Introduction, p. 1, http://www.cidco.com/iphone/intro2.html, visited on Feb. 10, 1999.

Alcatel Telecom- Technical Specs, p. 1-2, http://www.alcatel.com/telecom/mbd/products/products/detailed/term/tech.htm, visited on Feb. 16, 1999.

Alcatel's Internet Screenphone Based on Sun's PersonalJava™ and JavaOS for Consumers™ Wins CeBIT Oscar Best Communications Product 1998, p. 1-2, http://www.sun.com/javaos/consumers/oscar98.html, visited on Feb. 16, 1999.

CIDCO and Sun Announce Licensing Agreement Intended to Create New Consumer Internet Appliances Based on JavaOS for Consumers™ Software, p. 1-4, http://www.sun.com/javaos/consumers/press4.98.html, visited on Feb. 16, 1999.

Southwestern Bell Catalog, p. 1-2, http://www.swbell.com/, visited on Feb. 10, 1999.

Frazier, "Plug-in for Graphics Apps Adds Power to Special Effects," *Government Computer News,* vol. 16, No. 26, pp. 36-37, Sep. 1, 1997.

Amadio, "Phone Ahead: A New Breed of High-Tech Telephones Makes Doing Business Easier Than Ever," *Entrepreneur,* vol. 25, No. 12, pp. 56-58, Nov. 1997.

"Cool Stuff '98," *Computerworld,* vol. 31, No. 51, pp. 62-67, Dec. 22, 1997.

Rupley, "Feed Your E-mail Addiction," *PC Magazine,* vol. 16, No. 2, p. 10, Jan. 21, 1997.

"Uniden Spins Axis E-mail Telephone," *PC Week,* vol. 13, No. 45, p. 47, Nov. 11, 1996.

Bowles et al., "US West Brings Display-Based Telephony to Residential Customers with Nortel System," *Telecommunications,* vol. 30, No. 3, p. 82, Mar. 1996.

Kopf, "Perking Consumer Internet Use: Are Java-Powered Screen Phones the Answer?" *America's Network,* vol. 100, No. 12, pp. 108-110, Jun. 15, 1996.

Davey, Nortel Dialing Up Web Phones, *PC Week,* vol. 13, No. 21, p. 10, May 27, 1996.

*Getting Results with Microsoft Office 97,* Microsoft Corporation, pp. 113-126 and 348-352, 1997.

"OL97: How to Add an Address to Your Contacts Folder from an E-mail Message," http://support.microsoft.com/support/kb/articles/Q258/6/17.ASP?LN=EN-US&SD=gn&FR=0&, p. 1, 2001.

Doan, "Add-ins Give Outlook a Boost," *InfoWorld,* vol. 19, No. 32, p. 26, Aug. 11, 1997.

"Outlook Frequently Asked Questions," http://www.usi.edu/usihelp/outhelp/cntctfaq.htm, pp. 1-3, last modified Mar. 1, 1999.

"Sun Microsystems: JavaBeans™," Version 1.01, Graham Hamilton (Ed.), Sun Microsystems Inc., pp. 1-114, Jul. 24, 1997.

* cited by examiner

GRAPHICAL USER INTERFACE FOR A SCREEN TELEPHONE

RELATED APPLICATION DATA

This patent application claims priority to U.S. provisional patent application No. 60/098,187, filed Aug. 26, 1998, and U.S. provisional patent application No. 60/122,975, filed Mar. 3, 1999, which are hereby incorporated by reference.

FIELD OF THE INVENTION

The invention relates to telephony systems, and more particularly, relates to graphical user interfaces and software architectures for telephony devices.

BACKGROUND OF THE INVENTION

Today's telephony devices are becoming increasingly more sophisticated. A driving force of this trend is the convergence of functionality typically found in computers with functionality found in conventional telephones. One significant example of the convergence of phones and computers is a class of devices called smart screen phones. Though the specific hardware configuration of these devices varies widely, they typically share common elements such as a screen display, hardware buttons, telephone line interface hardware and a processor. Despite the advanced features that many of these devices provide, there is still need for improvement in many areas.

First, some screen phones available today have a small text-based display, typically arranged in a matrix of characters, and hardware buttons around the screen that are associated with specific screen areas to create virtual or soft buttons. This allows new functions to be programmed into the buttons over time, or as a result of navigating through menu choices with the buttons. Usability testing and research have shown that the mapping of a physical button and the on-screen text is often confusing and hard to follow.

Another problem is that traditional enhanced telephony services are difficult to use (such as call forwarding) because they require the user to remember arbitrary sequences of key-presses, and remember sequences of operations without explicit feedback (feedback tones or clicks).

An additional problem with the screen phone industry is the lack of an extendable, flexible software architecture that allows others to build a rich array of functions and application programs. Screen phones tend to be highly specialized devices constructed with special hardware and software to support a set of features. As such, they are difficult to customize or extend to support new features.

This lack of flexibility is particularly problematic in view of the lack of uniformity in the telephone network—where infrastructure components vary from region to region, country to country, and service provider to service provider. Each area may provide Caller ID, but supply it using different technologies, or supply Call Forwarding, but use different access codes.

The problems associated with architectural flexibility extend beyond the challenges raised by differences in the central office switching, hardware, and configuration. The underlying telecommunication network infrastructure is changing as well, and telephony devices must be adaptable to these infrastructures. For example, the telephone architecture should support choices between conventional infrastructures such as PSTN and ISDN. Looking to the future, the use of the Internet Protocol may become more commonplace as a telephone network infrastructure, and thus, there is a need to make telephony architectures readily adaptable to a variety of network infrastructures.

SUMMARY

The invention provides a user interface and related telephony program architecture for telephony devices. While aspects of the invention are particularly well suited for telephones with screen displays (e.g., screen phones), they apply to other telephony devices as well such as modems, answering machines and personal digital assistants.

One aspect of the invention is a visual user interface for a telephony device. The visual user interface includes a display screen with a variety of display elements for displaying information, receiving user input, or both. The visual interface may include various combinations of the following display elements: an application program selection area, a call slip area, a branding pane, a date/time pane for displaying date or time, a message pane, and a task pane for enabling the user to initiate a task in the telephony device.

The application program selection area provides a display of user interface controls that enable a user to select an application program, such as a web browser, address book, or answering machine/e-mail message retrieval application. In one implementation, the selection area is a button bar with control buttons that the user may select to initiate application programs or device features visually identified by the buttons.

The call slip area provides a call slip user interface for displaying telephone line state information. Call slips present a user interface for telephony applications. They have display elements that respond to changes in the phone line state by displaying user interface controls and information dependent on that state.

The branding pane displays a brand graphic. This feature allows an implementer of the telephony device to customize the interface for its product by displaying a brand bitmap, for example.

The message pane displays answering machine, e-mail or fax messages for one or more users. The message pane, in one implementation, is the visual representation of an application program for managing user messages created or received in the telephony device.

The task pane enables a user to initiate tasks executed in the telephony device directly by actuating a user interface control within the pane. These tasks may include, for example, a speed dial service, a service for composing an e-mail, a service for recording a note, or an on-line directory service.

Another aspect of the invention relates to the programming modules that control the display of the user interface for a screen phone. These modules include a shell program that controls the display of a user interface on a display screen of the phone, and pane programs that each control the display of a display element called a "pane" in the user interface. Default pane programs control the display of information and/or user interface controls in their respective panes. One or more of these panes may be associated with a parent application program that communicates state changes to a pane program, which in turn, updates the display to reflect these state changes.

One example of a default pane program is a message pane program that displays an indicator of user messages received in the phone. A parent application program notifies the message pane program when state changes occur, such as the arrival of a fax, e-mail or answering machine message. The message pane displays an indicator of the type of message that has arrived in the pane. For example, in one implementation, it displays a graphical icon representing fax, e-mail or answering machine message. The user can select the icon to access a viewer program for displaying and accessing the message.

Another aspect of the invention is a method for developing a user interface for a screen phone. The software platform for the user interface of the screen phone is distributed to implementers of the screen phone, e.g., equipment manufactures, telephone companies, etc. This platform includes program modules that provide some default user interface elements and programming interfaces. The implementer may customize the user interface by modifying a default user interface element or by creating custom program modules. The custom program modules may implement programming interfaces defined in the software platform, and may interact with default program modules through their programming interfaces.

In one implementation, an implementer receives a software platform, including a shell program and default pane programs. The shell program is responsible for displaying the user interface on the display screen of the phone. Each of the default pane programs display default panes in the user interface. The user may customize the user interface by selecting the default panes and creating custom panes.

Further features of the invention will become apparent with reference to the following detailed description and accompanying drawings.

DETAILED DESCRIPTION 1.0 Introduction

The invention is implemented in a software platform for a category of products referred to as "Web Telephones." A Web Telephone integrates voice telephony, Internet access including e-mail and Web browsing, an answering machine, and possibly other communications media such as fax and voice mail, into a single device. While this platform is designed for web telephones it also applies to a variety of telephony devices, including virtually any device that has access to a telephone network line (cable modem, ISDN, DSL, wireless, plain old telephone line, packet switched networks or Wide Area Networks that support telephone calls such as the Internet).

The software platform provides a fully functional user interface, and application programs, and also exposes programming interfaces and customizable features that allow others to modify its software components and user interface as well as add new software applications. The current implementation of the software platform interfaces with the Windows® CE Operating System, a subset of the Telephony Application Programming Interface (TAPI) and device drivers. Building on these components, it further provides a shell, application-level telephony applications, integrated application programs such as e-mail, address book, web browser, and a message center.

2.0 Home Page Graphical User Interface

The invention is implemented as a "start" or "home" screen of a telephony device. The terms "start" or "home" refer to a graphical user interface displayed on the device's display screen that provides a starting point for accessing features of the telephony device. This user interface also provides a place that the user returns to after finishing some task. For example, the user may access a feature of the device such as composing an e-mail, reviewing a message (e.g., answering machine, fax or e-mail message), browsing the Internet, or making a telephone call. The user initiates these tasks from the start screen, and these tasks display their own screens that partially or fully occlude the start screen. When the user completes a task, the display returns to the start screen. To be consistent throughout the remainder of the description, we refer to this user interface as the "start" screen.

Figure 1:
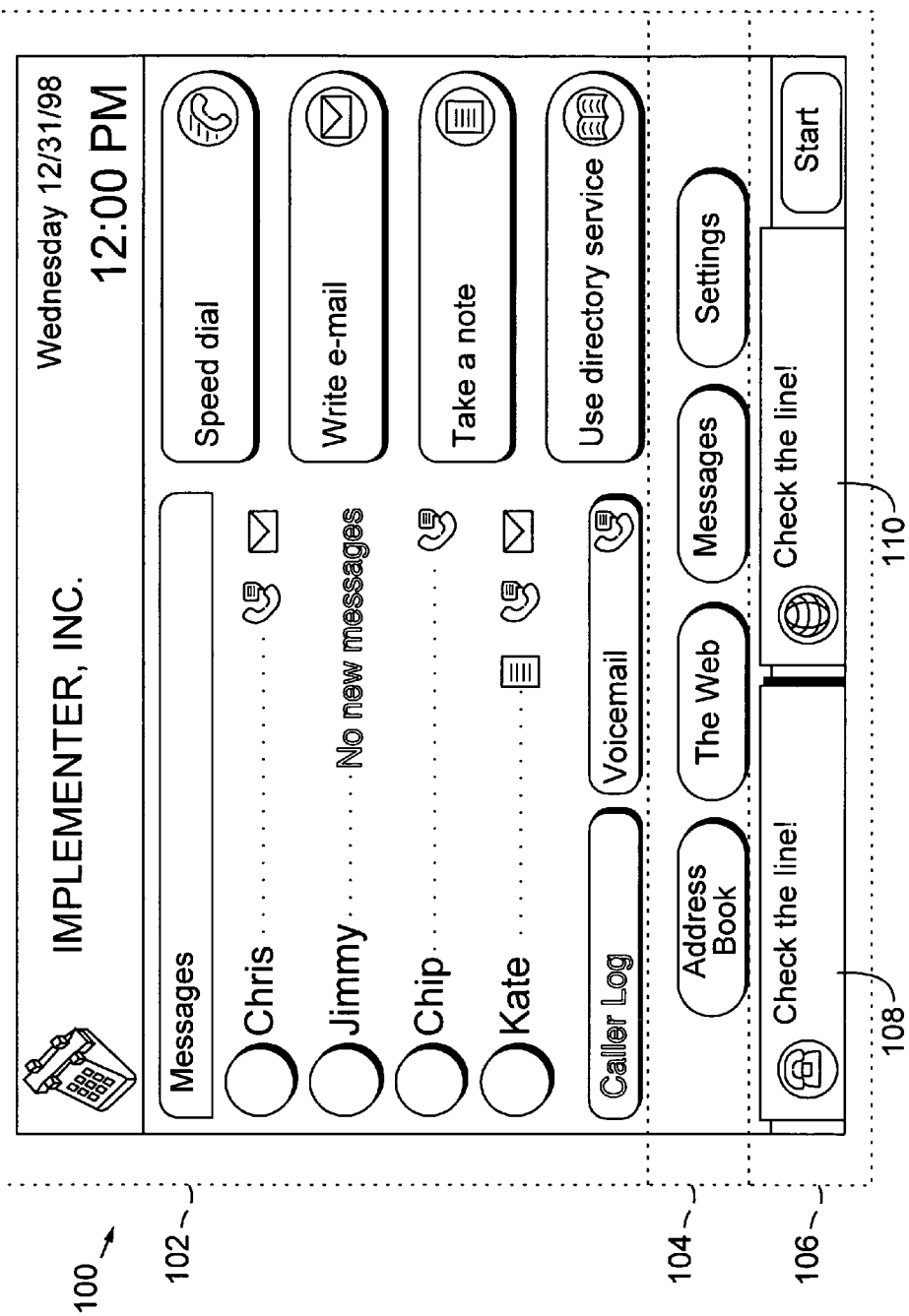
FIG. 1 illustrates an example of a graphical user interface for a screen phone.

FIG. 1 illustrates an example of the start screen (100). The start screen is composed of the following display elements: 1) a pane(s) area (102); 2) an application selection area (104) called the application button bar; and a call slip area (106).

The panes area (102) is a portion of the display screen that may be divided into multiple display elements called panes. The software architecture defines programming interfaces that allow the system implementer to provide custom panes that can be incorporated into the software platform of the telephony device. These programming interfaces allow the implementer to supply a custom pane that displays itself within the start screen and that interacts with other software components in the platform. The current implementation includes a default set of panes. These default panes may be modified or replaced with custom panes.

The application selection area (104) displays user interface controls that enable the user to launch an application program via an input device such as a touch screen or other cursor control device such as a mouse, trackball, joystick, etc. The implementation shown in FIG. 1 has a scrolling application button bar located beneath the panes area. The user interface controls are selectable buttons.

The call slip area (106) displays user interface elements called call slips (e.g., display elements (108, 110)). In the current implementation, the user interface displays a call slip for each telephone line in the device. It displays call state information associated with the telephone line. For more information about the call slip interface, see co-pending patent application Ser. No. 09/383,039 entitled "A COMMON VISUAL AND FUNCTIONAL ARCHITECTURE FOR PRESENTING AND CONTROLLING ARBITRARY TELEPHONE LINE FEATURES" filed concurrently herewith by Charles P. Schnarel, Maurcio Lomelin, Peter G. Chin, Derek S. Graham, Kate Welker, Robert C. Murdock, Justin C. Cooper, Laurence Golding, and Suzanne Walsh, which is hereby incorporated by reference.

Having provided an overview of the start screen, we now provide additional information about each of the display elements in the current implementation.

2.1 Panes Area

A pane is a display element of an application program on the start screen (100). A pane displays itself as a child window of the start screen. Each pane appears as a rectilinear portion of the pane area on the start screen. However, the shape, number and size of the panes may vary.

The pane area is designed to allow customization of the start screen. A system implementer can create one or more custom panes and place these panes in the pane area. In addition, the implementer may use one or more default panes in combination with its custom panes.

2.1.1 Default Panes

Figure 2:
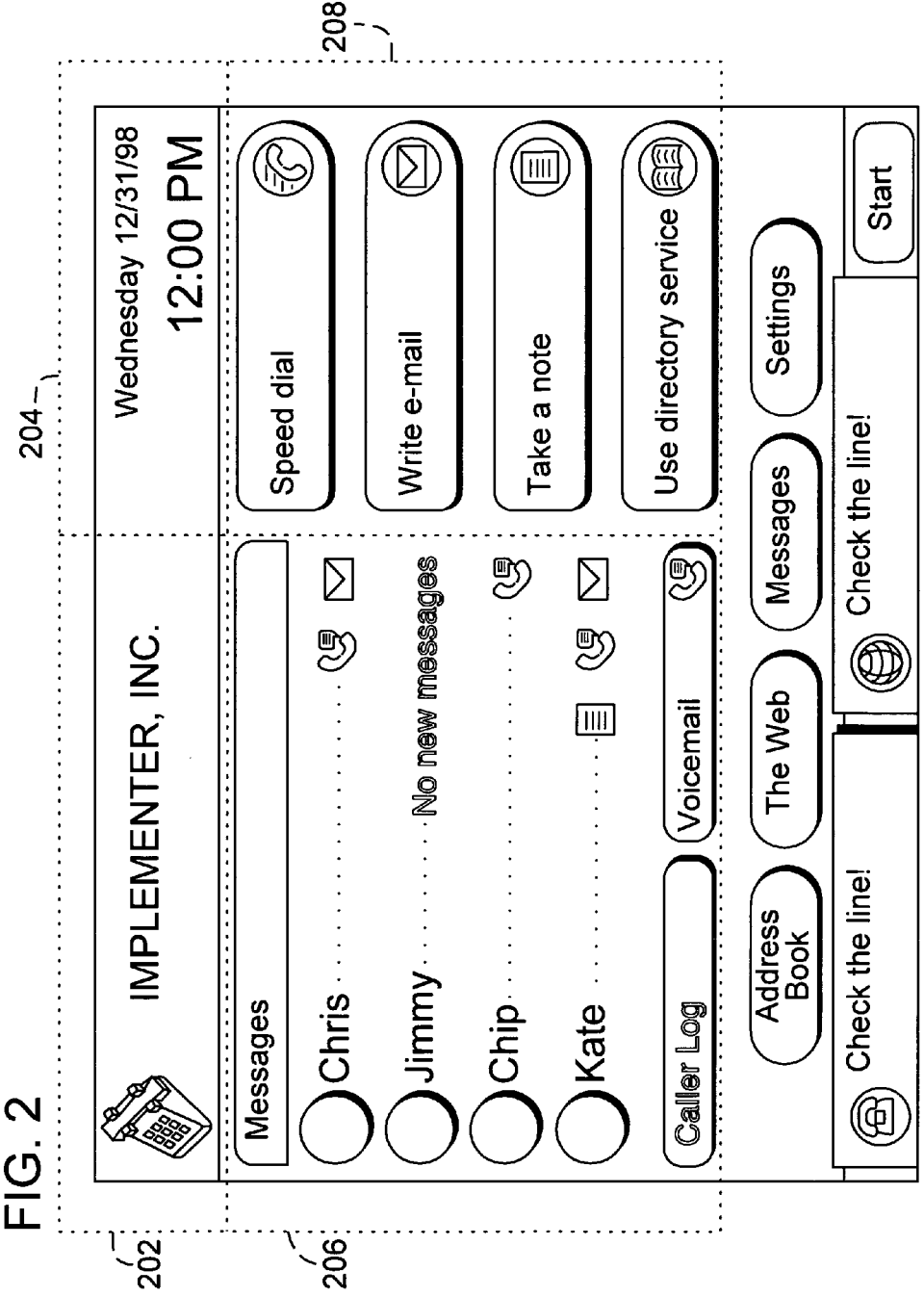
FIG. 2 shows the default panes in the user interface of FIG. 1 enclosed in dashed lines.

FIG. 2 illustrates an example of the default panes in the current implementation. These include a branding pane (202), a date and time pane (204), a message pane (206), and a task pane (208). While the system implementer may use these default panes without modification, they also allow some level of customization. In particular, the implementer may reposition the panes within the pane area, and may resize and localize each default pane.

2.1.2 The Branding Pane

The branding pane (202) allows the implementer to supply a graphic, which the start screen displays in a designated portion of the display. For example, an implementer may want to establish brand identity by displaying a graphic of its brand name, logo or trademark. The graphic may be provided in the form of a bitmap. The branding pane acts as a URL hyperlink to allow the user to access the implementer's webpage. When the user presses the branding pane, it displays a text message, such as "Would you like to connect to the Internet to learn more about this product?" This text message is displayed along with yes/no/cancel buttons. If the user selects "yes", the pane launches the browser and establishes a modem connection with the Internet Service Provider, whose telephone number is stored in the device's memory.

2.1.3 The Date and Time Pane

The data and time fields display the data and time, respectively. These fields initiate pre-programmed actions when the user selects them. In particular, the fields launch a settings application program that prompts the user to edit the date and time in response to user selection of the data and time fields.

2.1.4 The Task Area

The task area is a portion of the display that enables the user to access features of the device quickly. The task pane (208) shown in FIG. 2 illustrates default buttons that launch the following program tasks in response to user selection: 1) speed dialing, 2) writing an e-mail, 3) taking a note, and 4) using an on-line directory service. When the user selects one of these buttons, the software platform launches the task associated with the button.

The system implementer may customize the task pane by
  removing one or more default buttons;
  adding a custom task button that can launch an application and pass a command line to perform a specific function within a particular application;
  organize the buttons in any order; or
  localize any of the default buttons.

The default buttons provide examples of the type of functionality that may be implemented in the task pane.

When the user selects the speed dial button, it opens another screen representing the user interface of the speed dial feature. This screen enables the user to instruct the device to dial a party's phone number by selecting the name of that party on the screen.

The write e-mail button enables the user to access a user interface screen for composing an e-mail. The behavior of the write-e-mail button depends on whether an Internet e-mail account is already established. If an account is established, the e-mail button procedure launches a task for composing an e-mail message, which in turn displays a user interface for composing the message. If not, the button procedure invokes a task and its associated user interface for setting up an e-mail account. In cases where the device currently has two or more accounts, the button procedure prompts the user to enter his/her name to identify the appropriate account to be used.

When the user selects the Take a note button, its procedure launches an application for composing a note, which in turn, displays in interface for composing the note.

When the user selects the Use On-line Directory button, its button procedure launches a web browser application program, which displays its user interface and proceeds to establish an Internet connection and download a Directory web page using a URL associated with the button.

2.2 Messages Pane

The messages pane is a portion of the start screen dedicated to displaying the names of the user accounts established in the device, as well as the presence of user-specific messages (such as answering machine messages and e-mail messages) and general-user messages (such as faxes, caller logs, and voice mail messages.) Users can quickly discover whether or not they have new messages and quickly access these new messages.

Figure 3:
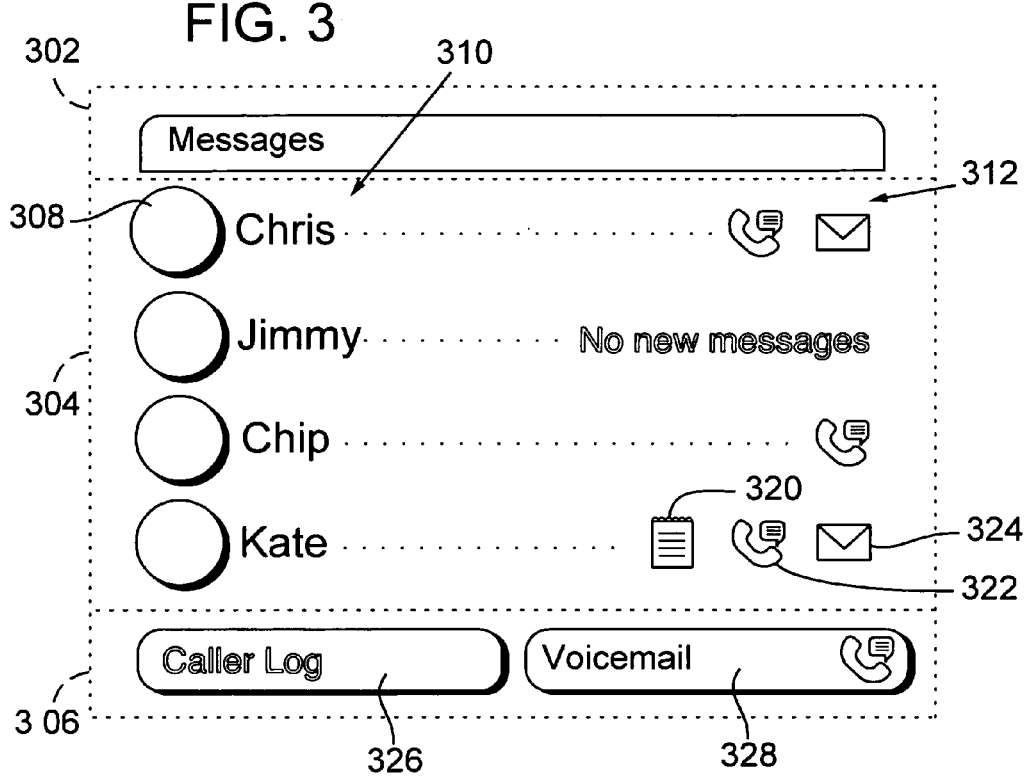
FIG. 3 illustrates a default pane in the user interface of FIG. 1 called the "messages pane."

As shown in FIG. 3, the messages pane is broken into three main areas:
  Messages graphic area (302)—A graphic identifying the messages pane.
  User-specific messages display area (304)—allows each user to see if they have any new messages and to access messages.
  General-user messages display area (306)—allows each user to see if there are any new non-user-specific messages on the device.

2.2.1 Messages Graphic Area

The messages graphic area (302) displays a graphic identifying the messages pane. In the current implementation, it is removed if there are more than 5 user accounts that are displayed in the User-specific messages display area (304).

2.2.2 The User Specific Messages Area

The User-specific messages display area (304) displays the name of each user, informs each user of the presence of new user-specific messages, and allows the user to quickly access their messages. It includes the following display elements:
  User-specific messages button (308);
  User account name (310);
  New messages icon list (312); and
  Implementer-defined 'filler' Bitmap.

When the user selects the User-specific messages button (308), the button's procedure launches a message viewer application. If the user has activated a security feature, then the password screen opens first, prompting the user to enter a password. If the user enters the correct password or does not have security activated, then the button procedure launches a message viewer application. The particular message viewer that is chosen depends upon the type of new messages available. The following order of precedence applies for selection of message viewer type:

1. If there are new personal notes, then launch the notepad message viewer;
2. If there are new answering machine messages, then launch the answering machine message viewer;
3. If there are new e-mail messages; then launch the e-mail message viewer
4. If the user has no new messages, then the default message viewer is the most recently used viewer.

The user account name field (310) displays the text stored in the user account name exactly as it was entered in the account name setting, except in those instances where the name is longer than the space allocated to display. In such an instance, no text shall be "clipped" by the user account name field. If more text is contained in the string than can be displayed in the user account name field, then an ellipsis ( . . . ) is displayed to indicate that the name is longer than the space allocated to the name field.

The current implementation adheres to the following rules governing the order in which it presents the user account name fields. User accounts are displayed in numeric order such that the user account with the smallest number designation (e.g., user account 1) is presented at the top of the list and the user account with the largest number designation (e.g., user account 5) is presented at the bottom of the list. inactive/unused user accounts are not displayed. Finally, user accounts collapse such that active accounts are presented in a contiguous list. For example, if account 2 and 4 are active (e.g., have user data associated with them) and accounts 1, 3 and 5 are inactive (e.g., do not have user data associated with them), then account 2 should be at the top of the list, followed immediately by account 4. Accounts 1, 3 and 5 are not displayed.

The user account field responds to user selection in the same manner as the user-specific message button associated with that field.

As shown in FIG. 3, the new messages icon list (312) is a row of icons that is displayed to the right of the user account name field. An icon is only presented when a new message exists. If no new user-specific messages exist for a particular user, then the text 'No new messages' is displayed. Since the message icons are associated with individual users, the icon list displays those message-types that are user-specific. For example, personal messages such as e-mail and answering machine messages are included, but shared information such as a fax and caller log are not included.

The types of messages represented with icons include notepad (320), answering machine (322), and e-mail messages (324). The software platform is designed to update the message list within a predetermined period of time (e.g., at most five seconds) within receipt of the message.

When the user selects an icon in the new messages icon list, a procedure associated with the icon launches a message center application program, which displays the appropriate message viewer. Similar security measures apply as with the account name and button fields described above. Each icon has an active area around it that is responsive to user selection. This area is a rectangle that encloses the icon.

The implementer-defined 'filler' bitmap is a series of graphics used to fill the void left when there are three or fewer user accounts displayed in the messages pane. This feature offers another potential for customizing the start screen because it enables the system implementer to provide its own bitmaps for display in this area.

2.2.3 General-User Messages Display Area

The general-user messages display area (306, FIG. 3) is used to display those message types that are not associated with an individual user. This portion of the screen displays an indicator notifying the user whether there are any new, non-user specific messages. In the current implementation, this indicator is in the form of a button that the user may select to access messages of a particular type, such as faxes, caller logs, and voice-mail messages. A voice-mail message is different from an answering machine message in that it is recorded by a voice mail service typically external to the device. Answering machine messages, in contrast, are typically recorded on the device, and are retrieved and managed via the message center application program and an answering machine viewer.

Figure 4:
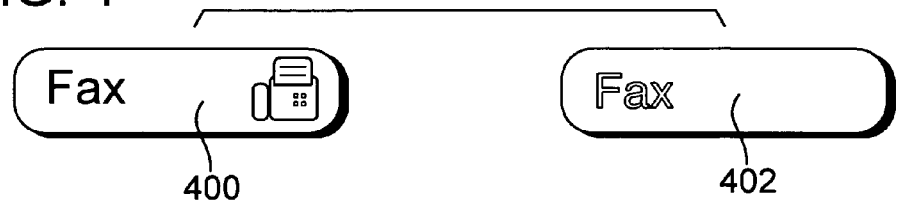
FIG. 4 illustrates an example of two user interface control states that depict the presence or absence of messages of a particular type.

The placement and size of the buttons within the general-user messages display area is modified dynamically depending upon the message transports available on the device. The message transports include a caller log transport that keeps a log of telephone calls on the device, a voice mail transport for accessing a voice mail service, and a fax machine transport for managing fax messages. Each of these message transports has a corresponding button on the start screen (see, e.g., display element (326) for caller log messages, and display element (328) for voice-mail messages). If the message transport is available on the device, the start screen displays its icon in the general-user message display area (306). Each button in this area has two states depending on whether there are new messages associated with the transport for that button. If there are new messages, then the button is in an active state, which is indicated two ways: the text is black (rather than gray) and an icon is displayed within the button. Conversely, if there are no new messages, the button is displayed in an inactive state, which is depicted by removing the icon and using gray text. FIG. 4 illustrates an example of these two message states for fax messages. The button on the left (400) shows the active state with black text and an icon depicting a fax message, and the button on the right (402) shows the inactive state with gray text of the word "fax." The general message buttons are dynamically updated by changing their visual appearance in response to a state change from no new messages to one or more new messages.

Each of the user interface controls in the general messages area enable the user to launch a task associated with the control. In response to selecting an active fax button, the messages application is launched and a fax viewer is displayed. If the device supports multiple users, then actuating the button may first cause a user interface screen to be displayed, prompting the user to identify herself/himself. Further, if the selected user is security enabled, then a password screen is displayed, prompting the user to enter a password. The call logger button behaves similarly. After prompting the user for a user ID and password (if multi-user and security features are enabled), pressing an active call logger button causes the messages application to launch, and a call log viewer to be displayed.

When the user selects the voice-mail button, it launches a program that instructs the device to dial a voice-mail number. The program waits for the service to answer, and provides the appropriate security code. At this point, the user may navigate the voice-mail system in a standard fashion. As with the SpeedDial Button, if the handset is not off-hook when the button is pressed, then the Speakerphone is taken off-hook.

2.3 The Application Button Bar

As shown in FIG. 1, the application button bar (104) is located directly above the call slip area on the start screen. The application button bar's primary functions are to inform the user of all applications that are available to them and to provide a vehicle for launching those applications.

In the current implementation, the application button bar is covered while an application is open, thus requiring the user to 'put away' the current application (i.e. 'go to the start screen') before launching another application.

The application button bar is central to the user's understanding of 'place' within the system. To alleviate the confusion created by application switching, the application button bar animates in such a way as to foster a spatial mental-model of the device. In this metaphor, the buttons act as icons representing application programs. When these applications are opened/expanded, the user is given visual cues that lead them to believe that the start screen still exists (albeit hidden) beneath the application that has been opened. These visual cues include an animation depicting an application switch.

In the example implementation shown in FIG. 1, application buttons are displayed in a single row in the application button bar. It is possible for the application button bar to contain more application buttons than can fit on the screen at a single time. In this case, scroll buttons are displayed at the extreme left and right of the application button bar. Pressing these scroll buttons displays application buttons that are not currently visible by 'sliding' the application buttons to the left or the right.

A system implementer may customize the device by adding, removing or rearranging the button order.

2.4 Call Slips

Each call slip displays a call slip window (e.g., (108, 110) in FIG. 1). Each of these windows has two states:
1) a collapsed state as shown in FIG. 1; and
2) an extended state to display additional line state information and user interface controls.

Figure 5:
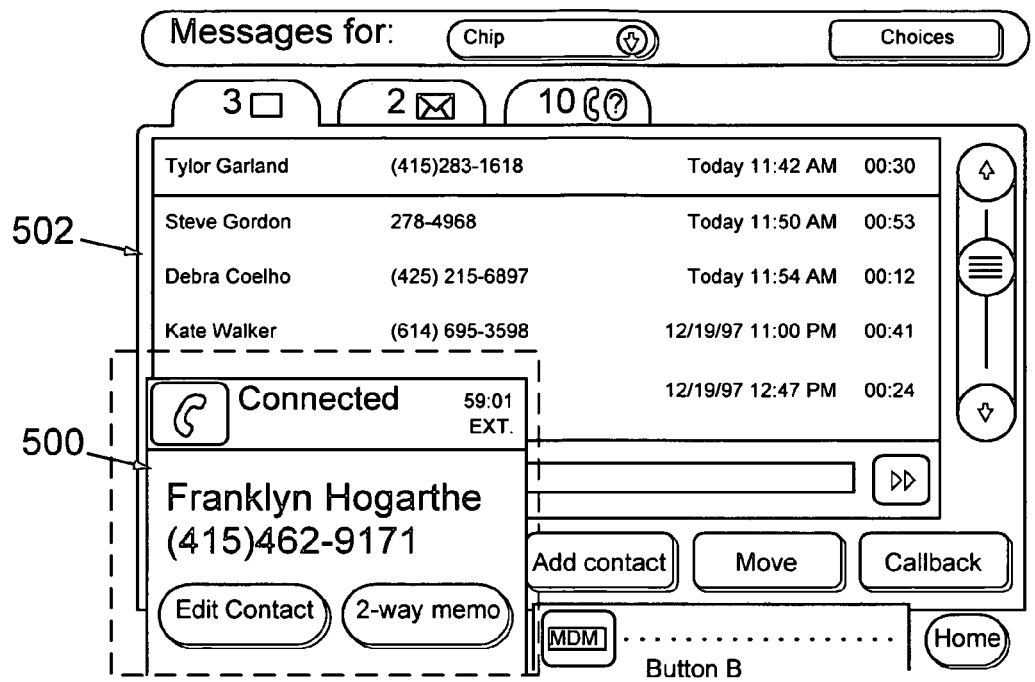
FIG. 5 illustrates an example of a user interface display element called a "call slip."

FIG. 5 illustrates an example of an extended call slip (500) over the user interface screen of the message center application (502).

Figure 6:
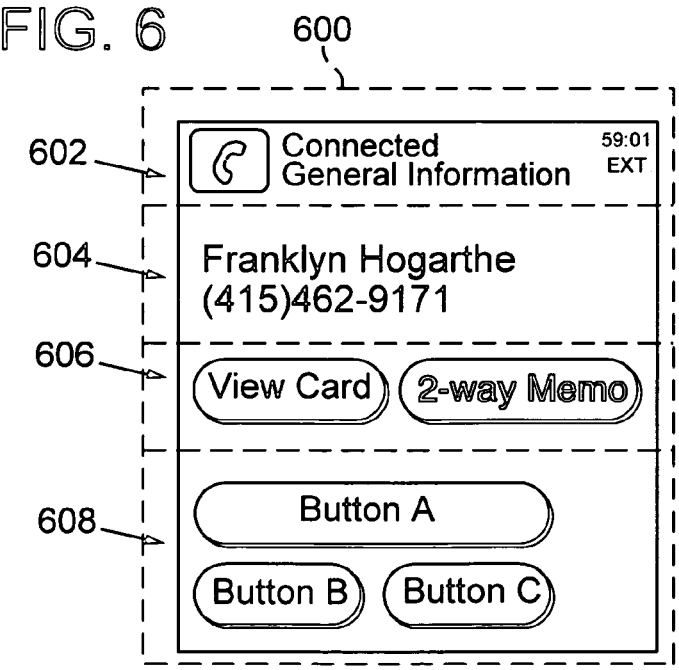
FIG. 6 illustrates a call slip display element in more detail.

As shown in FIG. 6, the call slip UI is composed of the following display elements:

The call slip window itself (600).

The summary status pane (602) is used to display general information about the line, such as the duration of the connection, indication of Parallel Set Detection (PSD), the line status, and general call information. The summary status pane is always visible to the user regardless of whether the call slip is collapsed or extended.

The call information pane (604) is used to display general information about the call, specifically the name and number of the calling party. This name and number data is derived from Caller ID/Caller ID on Call Waiting information (when available), as well as name and number data generated from an automated dial. Furthermore, this area is used to display DTMF digits during an outgoing call.

The call slip control pane(s) (606) may be used to display line state-specific and application-specific controls. The call slip may contain multiple call slip control panes or no call slip controls pane at all. The implementer is free to add additional call slip control pane(s). These panes may contain any of the GUI control elements provided by the software platform UI—with the exception of those controls which do not physically fit (e.g., list box, caption control, etc.). These controls may be used for any purpose. For example, a text field may be added which displays the number of metering pulses that a line has received. The software platform includes a default call slip control pane with pre-configured buttons. These buttons provide advanced control of the telephony device. An implementer is free to remove these buttons, or add buttons for initiating other features. Call slip control panes are designed to be visible only when the call slip is extended.

While the panes in the above example are rectangular, they can be drawn into a variety of arbitrary shapes, at a variety of places on the screen, and occupy a variety of screen portions.

3.0 Software Platform Architecture

3.1 Application Level Architecture

Figure 7:
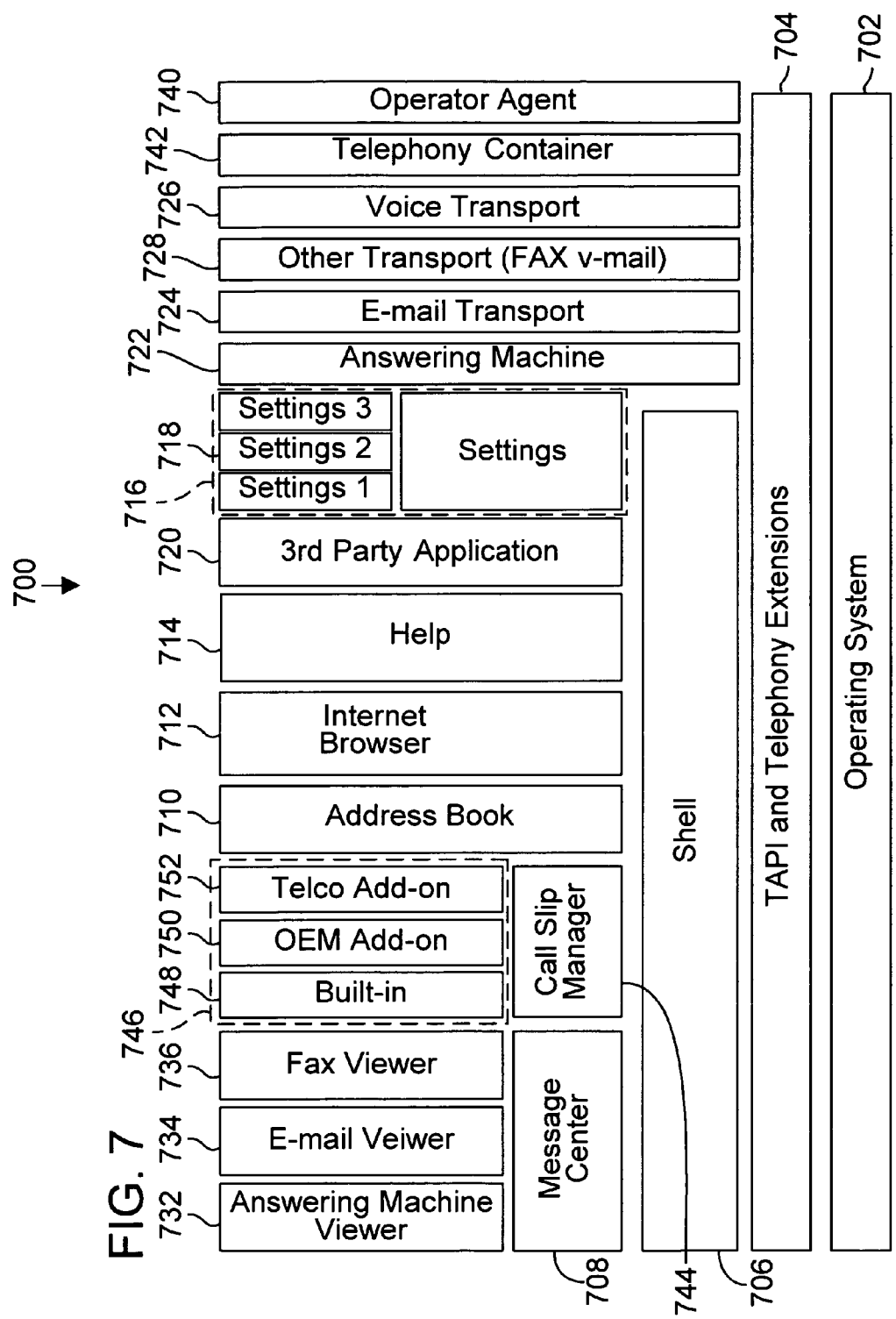
FIG. 7 is a block diagram illustrating the application level software architecture in a software platform that implements the invention.

FIG. 7 illustrates the application-level architecture of the current implementation. The application software executes on the Windows® CE operating system (operating system (702)) and uses a subset of the Telephony Application Programming Interface (TAPI) (704) from Microsoft Corporation to perform basic telephony tasks such as causing the phone to ring or generating a DTMF tone. The version of TAPI in this system supports incoming and outgoing voice calls, data modem calls and fax.

The shell (706) provides the framework of the graphical user interface. Though not specifically shown, applications can make direct access to the API of the operating system. In addition, applications can access services that the shell provides, such as an event scheduling service. The shell replaces the shell of the Windows® CE operating system, and it cooperates with application programs to provide a consistent user interface.

The application programs include telephony components (described more fully below), the message center (708), address book (i.e., a software component for accessing the contacts database) (710), web browser (712), help system (714), and an application (716) for modifying settings (718). The implementer may incorporate custom application programs (e.g., $3^{rd}$ party application (720) into the software platform. These applications may invoke platform services through the APIs of the shell (706), TAPI and telephony extensions (704), and the operating system (702).

The message center (708) provides integrated access to all types of messages that the user can receive through the host device, such as answering machine messages, e-mails, and faxes. For each type of message, the message center relies on a pair of components: a message transport and a message viewer. Examples of the message transport include answering machine transport (722), e-mail transport (724), voice transport (726), fax transport and voice-mail transport (728)). The message transport executes in the background, independent of the shell (706). It receives messages of a particular type and saves them to persistent storage. The message viewer plugs into the message center (which in turn plugs into the shell (706), as shown in FIG. 7), and provides the functionality for displaying and managing messages of a particular type. Examples of the message viewers include an answering machine viewer (732), an e-mail viewer (734), and fax viewer (736).

The Address Book application allows users to create, view, and manage a collection of "address cards," each of which contains information such as a name, address, phone numbers, and e-mail addresses. The persistent storage mechanism for the Address Book is the contacts database in the Windows® CE operating system.

The software platform includes a number of software modules for managing telephony functions. Referred to as the application level telephony software, these modules manage access to the telephone line, send and receive information via the line, and communicate telephone line information to a software module that manages the call slip UI element called the call slip manager.

The application-level telephony modules include an operator agent program (740), telephone monitoring application (TMA) programs (742), the transports (722-728), a call slip manager (744), and call slip programs (746). Some call slip programs are provided with the software platform (e.g., built-in or "default" call slip components (748)). The call slip manager provides an API and software architecture framework that enables an implementer, such as an Original Equipment Manufacturer (OEM) or telephone company (Telco) to incorporate new call slip components into the platform (e.g., OEM Add-on (750), Telco Add-on (752), etc.).

3.2 Telephony Application Architecture

Figure 8:
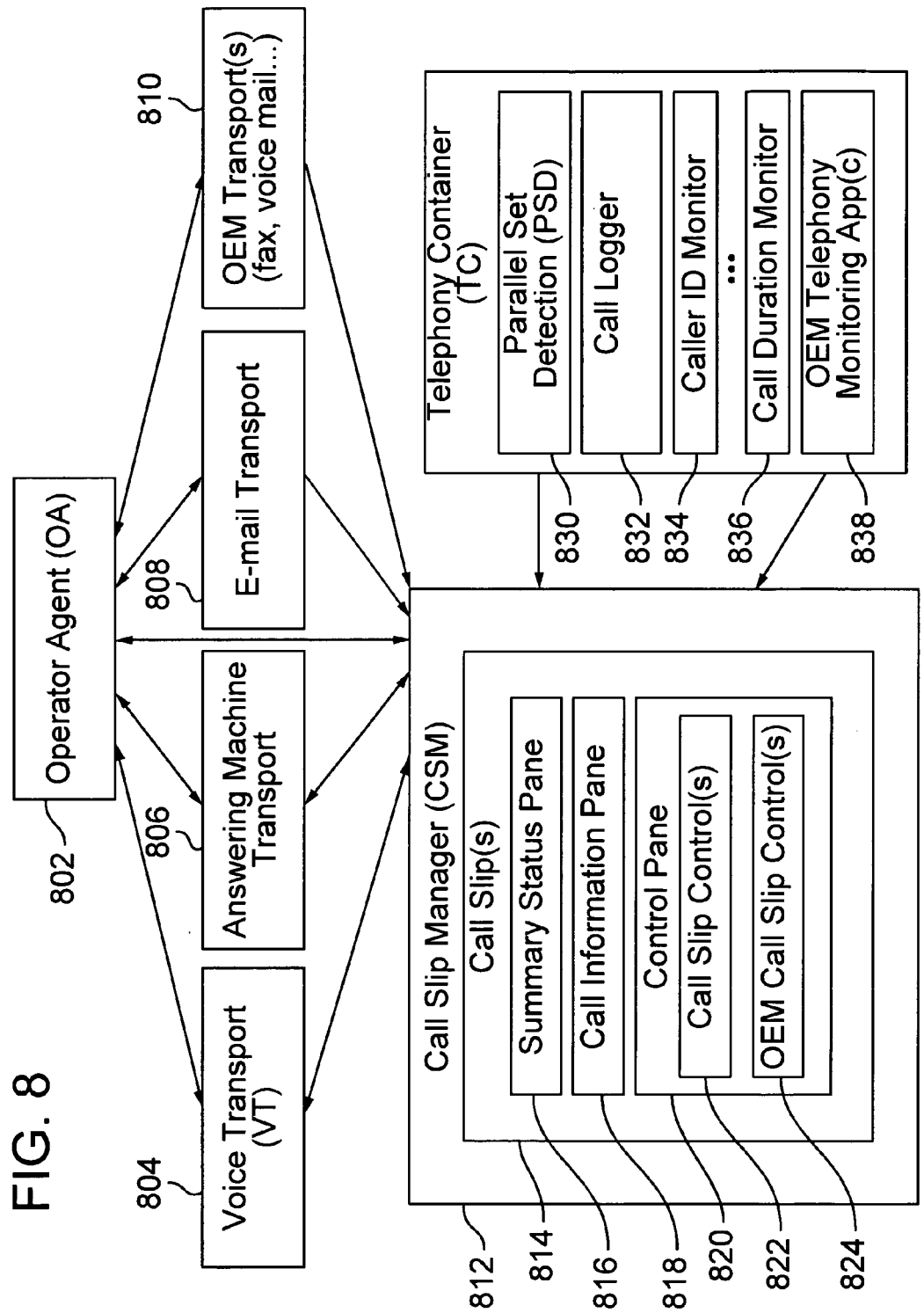
FIG. 8 is a block diagram illustrating the application level telephony components in the software platform of FIG. 7.

Having provided an overview of the entire system, we can now focus on the telephony components. FIG. 8 is a block diagram illustrating these components in more detail. The operator agent (802) is a code module responsible for determining the media mode of an incoming call and handing the call off to the appropriate transport.

The operator agent is implemented as a Protected Service Library (PSL). A PSL shares traits of a dynamic link library in that it exposes a programming interface, yet unlike a DLL, it is a separate, executable program that runs in its own address space. A PSL helps prevent data corruption because it does not allow client applications to access its address space.

The transports (804, 806, 808, 810) are responsible for sending and receiving calls of a particular media mode. Some, but not all, of the message transports are telephony applications (that is, they are clients of TAPI). The e-mail transport (808) is not a client of TAPI, but the voice (804) and the answering machine transports (806) are clients of TAPI. The e-mail transport (808) can both send and receive, while the answering machine transport (806) can only receive.

Those message transports that are telephony applications are marked in the registry as being potential targets of calls handed off from the operator agent (802). Each such telephony message transport is marked in the registry with the media modes it is willing to handle.

The voice transport (804) plays the role of the message transport for interactive voice calls. It is the application to which the operator agent (802) hands off an incoming call when a human answers, and it is the application responsible for creating and managing an outgoing voice call.

The call slip manager (CSM (812)) provides the user interface to telephony applications. The call slips (814) are in-process servers COM within the CSM process. To enable other processes to communicate with the call slips, the CSM exposes an API via the PSL mechanism.

Each pane within a call slip window is implemented as an in-process COM server in the CSM process. The user interface controls (e.g., buttons, list boxes, check boxes, etc.) are also COM objects and are implemented as window controls in their respective panes.

FIG. 8 illustrates the relationship among the call slip COM object, and related pane objects. For example, the summary status, call information and control panes (816, 818, and 820) are objects encapsulated within the call slip object. Default call slip controls (822) and implementer supplied call slip controls (e.g., OEM call slip controls (824)) are child windows of this host pane, namely the control pane (820).

The telephony architecture divides call logging and line in/out-of-service monitoring functions into separate TAPI client applications, each of which has a monitor privilege on the phone or the lines. These applications are referred to as telephony monitoring applications (TMAs). Examples of the TMAs include a Parallel Set Detection (PSD) TMA (630), a call logger (632), a caller ID monitor (634), and a call duration monitor (636). The implementer may also supply other TMAs (638).

A TMA can expose a user interface by communicating with the CSM (the line in/out-of-service application does this). It can also write information to a database (the call logger does this).

The advantage of having a separate application for each monitoring function is that it allows an implementer to add an additional monitoring function without modifying a complicated, monolithic TAPI application. For instance, an implementer could write a TMA to listen for metering pulses (special signals used for billing purposes on European telephone networks).

The process that houses the TMAs is the Telephony Container (TC). TC is launched automatically during system boot. When a TMA detects an event that it is monitoring, it invokes a function in the CSM programming interface to communicate the event to the CSM.

4.0 Implementation of Start Screen Panes

There are a variety of ways to implement the user interface panes in the start screen. One way is to couple the shell program with the application programs in such a way that the shell acts as a generic container for the applications. In this approach, each application may be designed with a programming interface that allows the shell to query the application for display content and pass events to the application via its programming interface. An alternative approach is to allow the application programs direct responsibility for displaying their own interface in the panes of the start screen. While these and other variations of these basic approaches may be used, one design consideration is the extent to which the implementer of a telephony device may build upon the software platform to customize the user interface. Below, we describe an implementation of the panes in the start screen and describe how the software platform supports customization of the start screen user interface.

4.1 Pane Implementation

The current implementation gives application level code the responsibility for displaying certain panes in the start screen. In particular, it uses the registry in the operating system to store information about which panes exist, and which piece of code is responsible for displaying each pane. The software platform places some user interface components of the start screen within the control of application programs, and others outside the control of application programs.

In the current implementation, each pane is drawn by an in-process COM component that exposes a programming interface called the IShellWindowPane interface. The information that defines each pane (its location on the screen, and the class identifier (CLSID) of the component responsible for displaying it) is stored in the registry under the key HKEY_LOCAL_MACHINE\Shell\Panes. Each pane has a unique identifier, called a PANEID (which is a typedef for a GUID). The PANEID is actually the CLSID of the COM server responsible for creating the pane.

The IShellWindowPane interface has the following method:

```
interface IShellWindowPane : IUnknown
{
    HRESULT Init(
                [in]    HWND    hwndShell,
                [in]    DWORD   x,
                [in]    DWORD   y,
                [in]    DWORD   cx,
                [in]    DWORD   cy
                );
}
```

The Init method gives the pane object an opportunity to create its display window as a child of the Shell's window hwndShell, at coordinates (x, y), with width cx and height cy.

4.2 Pane Creation and Destruction

When the shell program starts up, it reads the pane definitions from the registry. For each registered pane, the shell calls a function in the shell application programming interface called ShellAddPane, passing the pane's CLSID as read from the registry. ShellAddPane in turn calls CoCreateInstance, requesting an IShellWindowPane interface pointer. It then invokes the method IShellWindowPane::Init through that pointer. A pane usually implements the Init method by creating its display window as a child of the Start screen window. The shell program holds the IShellWindowPane interface pointer until it shuts down. It maintains a mapping between the PANEID of each pane and its interface pointer.

When the shell program shuts down, the method CShellWindow::OnDestroy calls the shell interface function called ShellDestroyPanes, which releases the interface pointer on each pane.

4.3 Interaction Between Panes and Applications

A pane is usually the visual representation of a particular application within the start screen of the shell program. We refer to this application as the "parent application". For instance, the message summary pane is the visual representation of the message center application within the start screen; the message center is the "parent application" of the message summary pane. However, a pane need not be associated with an application. An example would be the pane that displays branding information.

Certain changes detected by the parent application might need to be reflected in the pane. For instance, when a message transport detects the receipt of a new message, the icons at the right side of the message summary pane might have to be updated.

The mechanism by which a parent application communicates state changes to its pane is entirely up to the authors of the application and the pane. We describe here, as an example, the mechanism by which the message center communicates state changes to the message summary pane.

When the message summary pane is created, it calls a method IMessageCenter::RegisterForStatusChange. The pane passes its window handle as the argument to this function. Whenever the message center detects an event of interest to its pane, it posts the application-defined message WM_MSGCTRSTATUSCHANGE to every window handle it has received through IMessageCenter::RegisterForStatusChange. The WM_MSGCTRSTATUSCHANGE message carries information about what type of status change has occurred (for instance, a change in the number of users, the receipt or deletion of a message, or the installation of a new message provider). The message summary pane can then query for whatever information it needs to reconstruct its display. For instance, it can call EnumUsers (an API provided by the shell) to redisplay the list of user names, or it can call IMessageCenter::GetStatus (a method provided by the message center) to update the message icons.

We emphasize that this mechanism is only an example. Another application/pane pair could choose to use a different mechanism.

4.4 Registry Information

The format of the registry information for a Shell Window Pane is:

```
HKEY_LOCAL_MACHINE\Shell\Panes\
    {00000000-0000-0000-0000-000000000000}\
        x     100
        y     200
        cx     50
        cy     50
    {11111111-1111-1111-1111-111111111111}\
        x     150
        y     200
        cx     50
        cy     50
```

Each subkey under HKEY_LOCAL_MACHINE\Shell\Panes is the CLSID of the in-process COM server responsible for displaying the pane (the pane runs within the shell program process). The named values under this key give the position and size of the pane in pixels.

The responsible COM object has the usual entries under HKEY_CLASSES_ROOT. For instance:

```
HKEY_CLASSES_ROOT\CLSID
    {00000000-0000-0000-0000-000000000000}\
        InProcServer32\   msgpane.dll   The message summary pane
    {11111111-1111-1111-1111-111111111111}\
        InProcServer32\   oembrand.dll  A branding pane
```

A pane may be implemented using standard programming tools such as ATL class libraries or Microsoft Foundation Classes from Microsoft Corporation. ATL class libraries and MFC allow a developer to create a variety of COM objects. The implementation class derives from three types of parent classes:

1. The ATL classes that provide COM functionality,
2. The ATL window class CWindowImpl<T>, a lightweight class that provides the functionality of a window in the Windows® operating system and allows the developer to define a message map, and
3. The interface IShellWindowPane, which provides the functionality of a pane in the start screen of the shell.

For instance, the implementation class for the message summary pane is declared this way:

```
class ATL_NO_VTABLE CMessageSummaryPane :
    public CComObjectRootEx<CComSingleThreadModel>,
    public CComCoClass<CMessageSummaryPane,&CLSID_
```

```
        CoMessageSummaryPane>,
        public IShellWindowPane,
        public CWindowImpl<CMessageSummaryPane>
{
    //...
```

Since this class is both a window and a COM object, its class declaration has elements of both. For instance, the class declaration contains an interface map, which is used by ATL's implementation of QueryInterface:

```
BEGIN_COM_MAP(CMessageSummaryPane)
    COM_INTERFACE_ENTRY(IShellWindowPane)
END_COM_MAP( )
```

It also contains a message map that allows easy processing of messages in the Windows® operating system to the pane:

private:

```
BEGIN_MSG_MAP(CMessageSummaryPane)
    MESSAGE_HANDLER(WM_CREATE,   OnCreate )
    MESSAGE_HANDLER(WM_PAINT,    OnPaint  )
    MESSAGE_HANDLER(WM_TIMER,    OnTimer  )
    MESSAGE_HANDLER(WM_DESTROY,  OnDestroy)
END_MSG_MAP( )
```

Finally, it declares the methods of the COM interface that it exposes:

```
// IShellWindowPane
public:
    STDMETHOD(Init)(
        /* [in] */ HWND hwndShell,
        /* [in] */ long x,
        /* [in] */ long y,
        /* [in] */ long cx,
        /* [in] */ long cy
    );
```

4.5 API Reference

The following section provides a reference to the API functions and data types of the panes facility in the shell program.

EnumPaneProc
The EnumPaneProc function is an application-defined callback function that receives PANESTRUCT structures as a result of a call to the ShellEnumPanes function.
```
BOOL CALLBACK                  // pane.h
EnumPaneProc(
    PANESTRUCT*                // [in] pane information structure
        pPaneData,
    DWORD dwInstanceData       // [in] application-specific value
);
```
Parameters
pPaneData
Points to a PANESTRUCT structure describing the pane currently being enumerated.
dwInstanceData
A 32-bit, application-defined value provided by the caller of ShellEnumPanes, and passed through to the callback function.
Return Values
To continue enumeration, the callback function must return TRUE; to stop enumeration, it must return FALSE.
Remarks
The callback function can carry out any desired task.
An application must register this callback function by passing its address to ShellEnumPanes.
EnumPaneProc is a placeholder for the application-defined function name.
See Also
ShellEnumPanes, LPENUMPANEPROC
IShellWindowPane::Init
The Init method allows the pane to create its display window.
```
HRESULT IShellWindowPane::Init(    // shelpane.h
    HWND hwndShell,                // [in] Shell's main window
                                   //      handle
    DWORD x,                       // [in] left edge
    DWORD y,                       // [in] top edge
    DWORD cx,                      // [in] width
    DWORD cy                       // [in] height
);
```
Parameters
hwndShell
Handle to the Shell's Start screen window.
x, y
Pixel coordinates of the top left corner of the pane, relative to the Shell's main window.
cx, cy
Width and height of the pane in pixels.
Return Values
If the function succeeds, the return value is S_OK.
If the function fails, the return value is:
E_CANNOT_CREATE_PANE   Returned on any failure.
Remarks
In response to a call to Init, a pane should create a window that is a child of hwndShell, place it at location (x, y), and give it width cx and height cy. The child pane window will be repainted whenever the parent Shell window is. The child need not forward any messages (such as WM_COMMAND messages from buttons within the pane) to the parent window; the child is presumed to understand the meaning of events within its own window
ShellAddPane
This function creates a Shell Window Pane from information specified in a PANESTRUCT.
```
int ShellAddPane(              // pane.h
    PANESTRUCT*                // [in] pane description information
        pPaneData,
    HWND hwndShell             // [in] Shell main window handle
);
```
Parameters
pPaneData
Address of a PANESTRUCT structure describing the pane's location, and specifying the COM server that creates the pane.
hwndShell
Handle to the Shell's main window, of which the pane will become a child window.
Return Values
If the function succeeds, the return value is STATUS_OK.
If the function fails, the return value is one of the following:
E_BAD_POINTER           The pPaneData pointer is NULL, or is not a valid read pointer.
E_INVALID_ARG           hwndShell is NULL, or is not a valid window handle.
E_TOO_MANY_             The maximum number of panes has
SHELL_WINDOW_PANES      already been created.
E_CANNOT_CREATE_        CoCreateInstance failed.
SHELL_WINDOW_PANE
See Also
ShellDestroyPanes
ShellDestroyPanes
This function destroys all existing Shell Window Panes.
  int ShellDestroyPanes( );       // pane.h
Parameters
None
Return Values
This function always returns STATUS_OK.
Remarks
The Shell calls this functions when it shuts down. This function calls Release on every IShellWindowPane interface pointer the Shell holds.

-continued

```
This returns in the destruction of the COM object, which in turn causes
the pane window to be destroyed.
See Also
ShellAddPane
ShellEnumPanes
The ShellEnumPanes functions enumerates over all Shell Window Panes
by passing a PANESTRUCT* for each pane, in turn, to an application-
defined callback function. ShellEnumPanes continues until the
last pane is enumerated or the callback function returns FALSE.
    int ShellEnumPanes(          // pane.h
        LPENUMPANEPROC           // [in] callback function
    pfn Callback,
        DWORD dwInstanceData     // [in] application-specific value
    );
Parameters
pfnCallback
Points to an application-defined callback function. For more information
about the callback function, see the reference entry for EnumPaneProc.
dwInstanceData
A 32-bit, application-defined value to be passed to the callback function.
Return Values
If the function succeeds, the return value is STATUS_OK.
If the function fails, the return value is one of the following:
E_BAD_POINTER      The pfnCallback pointer is NULL, or is not a
                   valid code pointer.
E_REGISTRY_ERROR   There was an error reading registry
                   information, or the format or registry data was
                   incorrect.
See Also
EnumPaneProc
LPENUMPANEPROC
This data type is a typedef for the callback procedure required by the
ShellEnumPanes function.
    typedef BOOL (CALLBACK *LPENUMPANEPROC)(PANESTRUCT*
    pPaneData,
        DWORD dwInstanceData);
PANEID
This data type is a typedef for the unique identifier assigned to each pane.
    typedef GUID PANEID;     // shell32h.h
PANESTRUCT
This structure contains pane description information read from the registry.
    typedef struct panestruct_tag {   // pane.h
        PANEID paneID;               // CLSID of COM server for this pane
        DWORD x;                     // left edge
        DWORD y;                     // top edge
        DWORD cx;                    // width
        DWORD cy;                    // height
    } PANESTRUCT;
```

5.0 Hardware Implementation

Figure 9:
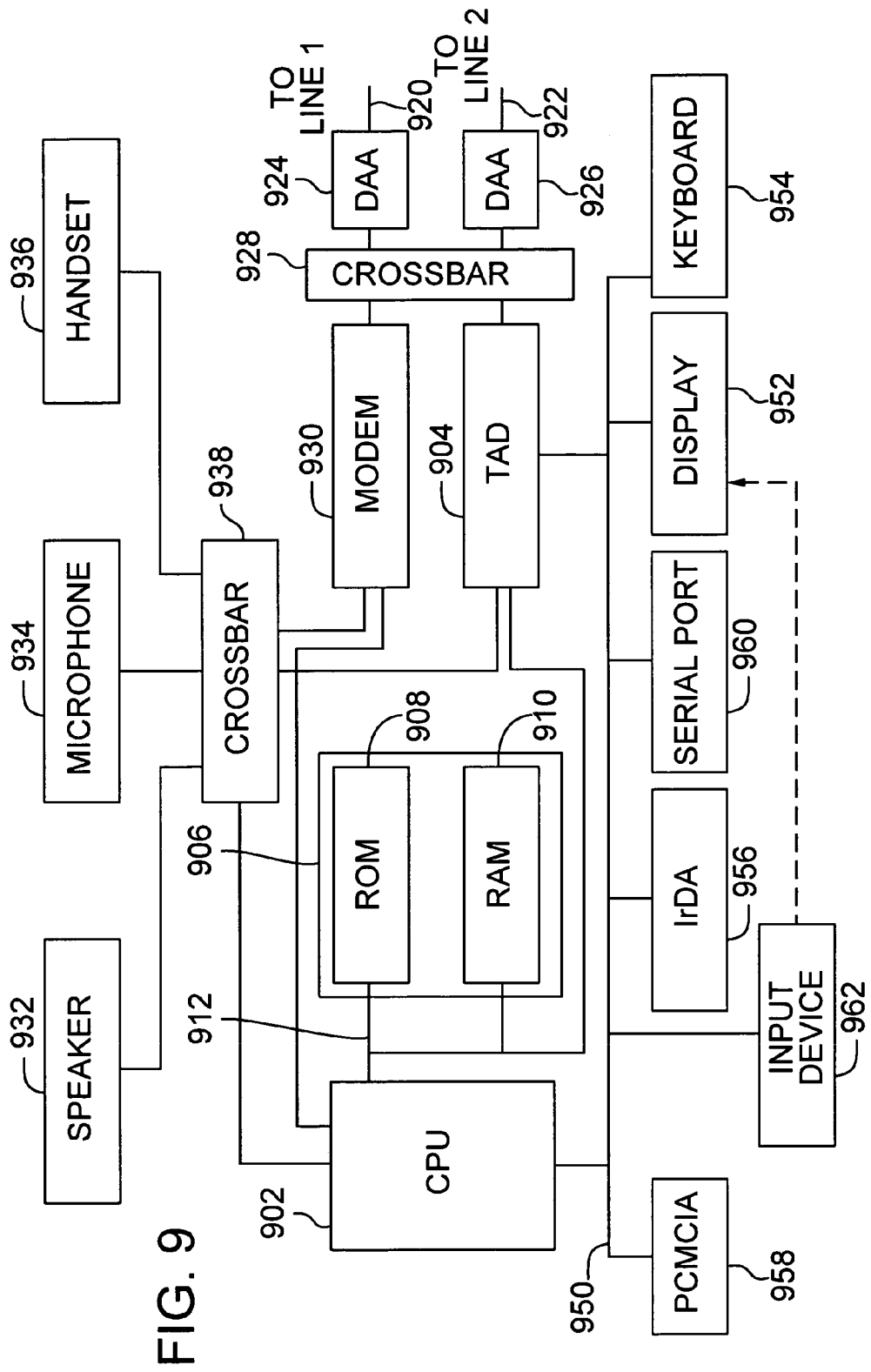
FIG. 9 is a block diagram of a screen phone that may utilize the graphical user interface of FIG. 1.

The software platform described above is designed to run on a variety of telephony device architectures. Some basic hardware elements are common to most implementations such as a processor (e.g., a CPU), a computer readable media (e.g., RAM/ROM), a screen display, and an input device capable of selecting display elements on the screen display. FIG. 9 is a block diagram illustrating an overview of a hardware architecture for a web telephone. This figure provides an example of hardware features, yet these features are not required in all implementations. The description of these features and an understanding of the software platform described above should make it clear that a variety of deviations from the hardware architecture are possible while still being capable of executing the software platform.

The processing resources of the telephony device may reside in one or more processor chips. Since the required processor performance varies depending on the demands of the processing functions of the device, the hardware implementation of the processing resources will vary as well. In the context of the web telephone discussed above, the processing functions include running the operating system and application programs and performing signal processing functions of the telephone, modem and fax machine. These functions may be carried out on a single host CPU or on a CPU in combination with a supporting Digital Signal Processing (DSP) chip and possibly other chips (e.g., a hardware modem).

In the following discussion, we describe the device architecture shown in FIG. 9, and then discuss a number of alternative architectures. In FIG. 9, the processing workload is shared between a CPU (902) and a DSP called a Telephone Answering Device (TAD) (904). As explained in further detail, a variety of telephony related program modules may be executed either in the host CPU or the TAD.

The CPU and TAD each have access to a memory system (906) that stores program code and data. The memory system of the device may include a combination of Read Only Memory (ROM) (908) and Random Access Memory (RAM) (910) as shown, as well as other conventional memory devices such as Flash memory and ADRAM (Audio DRAM). The CPU and TAD may access a shared memory system via a common memory bus (912) as shown, or alternatively, they may have their own memory systems that they access via a private bus. The CPU and TAD may also use a combination of shared and private memory. For example, a TAD chip may have a dedicated Flash/ADRAM device.

The program code and associated data of the software platform may be stored on a variety of computer readable media. Typically, it is installed on the ROM of the telephony device and loaded into RAM at runtime. The program code and its data may be distributed on a conventional storage media such as compact disk and loaded into the device's memory system by the manufacturer or end user. Alternatively, the code and data may be transmitted electronically via a telephone communication line connected to the device or via a computer network, and then installed by the user or by the device, for example, when it is re-booted.

There are a variety of alternative ways to enable remote updating of telephony features, and specifically features enabled through call slip components. These alternatives include updating the entire program image on the device, updating only the program files and data that have changed or are new, or installing code to support an array of features and then selectively enabling features.

The specific implementation of these alternatives depends in part on the configuration of the hardware. For example, in some devices, the memory system includes ROM and RAM memory. The RAM memory may further include a DRAM memory with a portion that serves as working memory (e.g., acts as storage for the operating system's memory heap) and another portion that serves as an object store (e.g., acts as storage for the operating system's file system). In addition, the device may include a flash memory to store data persistently such as the contact database, email data files, etc. In the current implementation, the contact database is a Windows® CE database, which has a size limitation of 64 kB per record. Flash memory has the advantage that it does not require a battery, but depending on the implementation, may have limitations in the way data can be stored on it (e.g., such as the 64 kB limitation of Windows® CE databases mentioned previously).

To implement remote updating using the first approach, the implementer may create an installer application that would be downloaded and run in the DRAM. It is responsible for partitioning a downloaded code image into chunks (e.g., each 64 kB) and loading these chunks into the flash memory. Instead of replacing the entire code image with a new, downloaded image, the installer could be designed to update the current code image with new, downloaded portions of the image that have changed or are new. Yet another approach to updating telephony features, and in particular call slip features, is to download an application program that turns on a key in the registry to activate a telephony component associated with that key.

The architecture shown in FIG. 9 supports two telephone lines (920, 922). The signal path of for each line is similar. Each telephone line connects to a standard telephone jack (RJ11). The telephone jack is connected to a Direct Access Arrangement (DAA) module (924, 926), which in turn is connected to a crossbar (928). A "crossbar" refers generally to a switching arrangement used to connect line terminating devices (e.g., handset audio, speakerphone audio, answering machine or modem) to a desired telephone line. Switches or crossbar arrangements are commonly used to switch codecs between a DAA transformers. Software executing in the CPU uses the crossbar connected to the DAA modules to switch the modem and voice circuits (the TAD) to the available lines.

FIG. 9 shows a modem (930) as a separate functional unit. The modem may be implemented in hardware or software. When implemented in software on the CPU, the CPU is connected to the crossbar via a serial interface (e.g., ST7546). When implemented in hardware, the CPU is connected to the hardware modem via a serial port, and the modem (930) is connected to the crossbar (928).

The TAD (904) manages a variety of telephony functions relating to voice calls. As noted, it interfaces with the telephone line via a crossbar (928) or equivalent switching arrangement. The TAD interfaces with the components familiar to the user, such as the speaker (932), microphone (934) and handset (936), via a variety of standard drivers and switching arrangements, shown functionally as a crossbar (928) in FIG. 9. In both cases, the TAD generally uses a codec chip to manage coding and decoding of the voice signal.

The device may also include a variety of peripherals connected to the CPU via a bus or collection of interface circuitry (950). These peripherals include a display (952), keyboard (954), Infrared Data Association (IrDA) compliant transceiver (956), PCMCIA port (958), serial port (960), etc. The device preferably includes an input device (962) that allows the user to select user interface controls on the display, such as a cursor control device or touch screen. The device may also be implemented to support voice activated input with a combination of hardware (e.g., the microphone) and software to decode and perform voice recognition of voice signals.

As noted above, the telephony device may execute telephony programs in the host CPU, a TAD or other hardware components.

These functions include: voice compression, Dual Tone MultiFrequency (DTMF) detection, DTMF generation, modem functions, speaker phone functions (for full duplex speaker phones, this functionality may include double talk detection, acoustic and near end echo cancellation), digital telephone answering machine functions, and Analog Display Services Interface (ADSI) signaling.

ADSI is a Bellcore standard defining a protocol on the flow of information between something (a switch, a server, a voice mail system, a service bureau) and a subscriber's telephone, PC, data terminal or other communication device with a screen. ADSI signaling encompasses caller identification (CID) and Caller Identification on Call Waiting CID CW. To implement CID, the caller's number and name are transmitted to the receiving device during the first and second ring signaling an incoming call. To implement CID CW, the caller's number and name are transmitted to the receiving device along with the call waiting signal. A modulation technique called Frequency Shift Keying (FSK) is used for the transmission of Caller ID and Call Waiting Caller ID data.

The devices used to support these telephony functions vary, depending on the implementation.

The following list provides some possible implementations:

1. Full host emulation where a CPU (e.g., a Digital Semiconductor StrongArm SA-100) implements DSP functional modules in software. The software modules may include a V.34 software modem, an ADSI module, a speakerphone module, digital telephone answering device module, and a DTMF module.
2. Partial host emulation in a CPU (e.g., a Digital Semiconductor StrongArm SA-100), with a caller ID chip and a hardware FSK modem.
3. Partial host emulation in a CPU (e.g., a PPC821) running a software modem, with a TAD chip that provides a full duplex speakerphone, TrueSpeech Compression, CID, CIDCW, and DTMF functions.
4. A DSP phone including a CPU (e.g., SA110), with a TAD chip that provides a full duplex speakerphone, TrueSpeech Compression, CID, CIDCW, and DTMF functions, and a hardware V.34 modem. In this implementation, the modem acts primarily as a data communication front end to the CPU.
5. A Voice modem implementation including a CPU (e.g., SA110) and a voice modem used to provide a speakerphone, call progress tone (CPT) generation, CID, DTMF, voice compression, and data modem.

In the last two cases, there is essentially no DSP software running on the host CPU, and therefore, the main requirement of the CPU is the ability to handle line management and user controls in a real time fashion. As illustrated in this brief list, there are a wide variety of possible implementations.

CONCLUSION

While the invention is described with reference to specific implementations, the scope of the invention is not limited to these implementations. The start screen has a number of features that are unique, whether considered alone or in combination with other features. Therefore, the specific combination of features shown above should not be construed as being a necessary element of the invention.

In view of the many possible implementations of the invention, it should be recognized that the implementation described above is only examples of the invention and should not be taken as a limitation on the scope of the invention.

We claim:

1. A tangible computer-readable medium having stored thereon computer-executable instructions for implementing a customizable visual user interface on a screen display of a telephony device comprising:
    an application program for providing services to a user on the telephony device;
    a shell program that exposes an application programming interface for customizing the customizable visual user interface;
    a message center operatively connected to the shell program for providing access to a user message; and a telephony module for managing telephony functions, wherein the application programming interface exposed by the shell program comprises one or more methods, the application programming interface receiving input from an application, and wherein execution of the one or more methods of the application programming interface is responsive to the input from the application for customizing the customizable visual user interface, wherein the telephony module includes an operator agent for determining a media mode of an incoming call.

2. The computer-readable medium of claim 1 wherein the operator agent further hands the incoming call to the message transport based on the media mode.

3. The computer-readable medium of claim 2 wherein the operator agent is implemented as a Protected Service Library (PSL).

4. The computer-readable medium of claim 2 wherein the message transport includes at least one of an answering machine transport, an e-mail transport, a voice transport, a fax transport, a call slip manager, a telephony container, and a voice-mail transport.

5. The computer-readable medium of claim 2 wherein the message transport includes a call slip manager that exposes a call slip manager application programming interface, the call slip manager including at least one object.

6. The computer-readable medium of claim 5 wherein the at least one object has at least one function associated with the call slip manager application programming interface, and wherein the call slip manager further exposes the call slip manager application programming interface for accessing the at least one function of the at least one object.

7. The computer-readable medium of claim 6 wherein the other processes are capable of communicating with the at least one object via the application programming interface of the call slip manager.

8. The computer-readable medium of claim 6 wherein the at least one object includes at least one pane encapsulated in the at least one object.

9. The computer-readable medium of claim 8 wherein the at least one pane includes at least one of a summary status pane, a call information pane, and a control pane.

10. The computer-readable medium of claim 9 wherein the at least one pane includes a control pane and wherein the control pane further includes at least one of a call slip control pane and an implementer supplied call slip control pane.

11. The computer-readable medium of claim 10 wherein the at least one pane includes the control pane and the control pane includes the implementer supplied call slip control pane and wherein the implementer supplied call slip control pane includes an OEM call slip control.

12. The computer-readable medium of claim 6 wherein the call slip manager application programming interface includes an ICallSlip interface and wherein the at least one function includes one of a function for sliding the object on the display screen, responding to telephony events, communicating changes in line state, and communicating changes in line information.

13. The computer-readable medium of claim 8 wherein the at least one pane exposes a pane application programming interface, wherein the pane application programming interface receives input from a user and wherein the display appearance of the at least one pane is modified based on the input.

14. The computer-readable medium of claim 13 wherein the at least one pane receives an interface pointer associated with the corresponding at least one object.

15. The computer-readable medium of claim 14 wherein the at least one object provides a service corresponding to the interface pointer to the corresponding at least one pane.

16. The computer-readable medium of claim 1 wherein the message transport includes at least one object having at least one function and including at least one pane encapsulated in the at least one object on the visual user interface and wherein customizing comprises adding one or more panes to the visual user interface for the telephony device.

17. The computer-readable medium of claim 16 wherein the one or more panes added to the visual user interface is associated with a parent application separate from the shell program.

18. The computer-readable medium of claim 17 wherein the parent application is operable to communicate with the shell program via the application programming interface.

19. The computer-readable medium of claim 1 wherein the customizable visual user interface further comprises a message transport for receiving the user message and a message viewer for outputting the user message.

20. The computer-readable medium of claim 19 wherein the message transport executes in the background separately from the shell program.

21. The computer-readable medium of claim 20 wherein the message transport includes a telephony application.

22. The computer-readable medium of claim 20 wherein the message transport includes a voice transport for receiving an incoming call from an operator agent.

23. The computer-readable medium of claim 22 wherein the voice transport further creates and manages an outgoing voice call.

24. The computer-readable medium of claim 1 wherein the telephony module comprises one of an operator agent, a telephone monitoring application, a transport, a call slip manager, and a call slip program.

25. The computer-readable medium of claim 24 wherein the telephony module includes a call slip manager, the call slip manager providing a second application programming interface for receiving input from an implementer, new slip components being incorporated into the module based on the input received at the second application programming interface.

26. The computer-readable medium of claim 1 wherein the shell program provides a framework of the customizable visual user interface on the screen display of the telephony device.

27. The computer-readable medium of claim 1 wherein the shell program provides services and receives input from an application via the application programming interface exposed by the shell program.

28. The computer-readable medium of claim 27 wherein the services provided by the shell program includes an event scheduling service.

29. The computer-readable medium of claim 1 wherein the shell program incorporates a custom application program via the application programming interface exposed by the shell program.

30. The computer-readable medium of claim 29 wherein the custom application program invokes a platform service of the shell program through the application programming interface exposed by the shell program.

31. The computer-readable medium of claim 30 wherein the custom application program includes a third party application.

32. A method of creating a customizable visual user interface for a telephony device with a screen display, the method comprising:

providing, on one or more tangible computer-readable media, software comprising computer-executable instructions for customizing the customizable visual user interface, the customizable visual user interface comprising a branding area for displaying a brand graphic, wherein the branding area is operable to allow a user to connect to an internet location via the telephony device, and wherein the internet location is associated with the brand graphic;

wherein the software for customizing the customizable visual user interface comprises at least one application programming interface comprising one or more methods for adding one or more custom panes corresponding to a parent application to the customizable visual user interface, the at least one application programming interface exposed by a shell program;

wherein the software for customizing the customizable visual user interface is provided by a first software provider to a second software provider; and wherein customization of the customizable visual user interface is performed by the second software provider using the application programming interface.

33. A method for developing software to run on a telephony device, the method comprising:

receiving, on one or more tangible computer-readable media, a software platform comprising computer-executable instructions for displaying a user interface on a display screen of the telephony device, wherein the software platform includes a shell program that exposes a programmatic programming interface operable to provide functionality for customizing the user interface;

receiving default user interface program modules that each display default user interface elements in the user interface; and creating a custom user interface program module, wherein the custom user interface program module uses the programmatic programming interface operable to provide functionality for customizing the user interface and displays a custom user interface element in the user interface, the custom user interface element associated with a parent application not included in the received software platform or the received default user interface program modules; and enumerating the custom program module in a data structure of an operating system to enable the software platform to identify the custom user interface element and add the custom user interface element to the user interface.

34. A method for developing software to run on a telephony device, the method comprising:

receiving, on one or more tangible computer-readable media, a software platform comprising computer-executable instructions for displaying a user interface on a display screen of the telephony device, wherein the software platform includes a shell program that exposes a programmatic programming interface operable to provide functionality for customizing the user interface;

receiving default user interface program modules that each display default user interface elements in the user interface; and creating a custom user interface program module, wherein the custom user interface program module uses the programmatic programming interface operable to provide functionality for customizing the user interface and displays a custom user interface element in the user interface, the custom user interface element associated with a parent application not included in the received software platform or the received default user interface program modules receiving a set of application programs associated with the default user interface elements; and for a selected default user interface element, selecting an associated application program from the set to be loaded onto and executed in the telephony device;

wherein the associated application program uses the selected default user interface element as a user interface.

35. The method of claim 34 wherein the default program modules include a message program module for displaying a user interface for a message center application program in a message pane;

wherein the message center application program communicates state changes to the message program module, and wherein the message program module updates the message pane to reflect the state changes.

36. The method of claim 35 wherein the state changes include arrival of a fax, email, or answering message, and the message program module updates the message pane by displaying an indicator of the arrival of the message.

37. A tangible computer readable medium having programming modules that control display of a user interface of a screen phone, the programming modules including:

a shell program for controlling display of a user interface on a display screen of the screen phone, wherein the shell program exposes a programmatic programming interface operable to provide functionality for customizing the user interface;

default pane programs that each control display of default panes in the user interface, at least one of the default pane programs providing a user interface for a parent application program;

wherein the parent application program communicates state changes to a corresponding default pane program, and the corresponding default pane program updates the default pane to reflect the state changes; and wherein the programmatic programming interface provides one or more methods for creating one or more custom panes for display in the user interface, the custom panes associated with one or more parent applications outside the shell program.

38. A method of developing software for a customizable visual user interface for a telephony device with a screen display, wherein the customizable visual user interface comprises:

a message area for displaying a visual indicator of fax, e-mail, or answering machine messages, the method comprising:

providing, on one or more tangible computer-readable media, software comprising computer-executable instructions for implementing default elements of the customizable visual user interface and customizing the customizable visual user interface to a custom software implementer;

wherein the software for implementing default elements of the customizable visual user interface and customizing the customizable visual user interface comprises one or more application programming interfaces comprising one or more methods for customizing the visual user interface, wherein at least one of the one or more application programming interfaces is exposed by a shell program and comprises a method for adding a custom pane corresponding to a parent application to the customizable visual user interface.

39. The method of claim 38 wherein the customizable visual user interface further comprises a branding area for displaying a brand graphic.

40. A computer-implemented method for providing run-time customization of a user interface of a telephony device, the method comprising:
- at run-time of the user interface, accepting an indication that a new user interface element is to be added to the user interface of the telephony device; and
- responsive to the accepting, adding the new user interface element to the user interface of the telephony device;
- wherein the accepting facilitates customization of the user interface of the telephony device at run-time of the user interface; and
- wherein the new user interface element is associated with a parent application separate from a shell program implementing default elements of the user interface,
- wherein the accepting is accomplished via a programmatic programming interface, the method further comprising:
- via the programmatic programming interface, accepting an indication that the new user interface element is to be registered for receiving messages related to the new user interface element.

41. A tangible computer-readable medium having stored thereon software for implementing a customizable visual user interface for a telephony device with a screen display, the visual user interface comprising:
- an application program selection area, including user interface controls for selecting application programs;
- a call slip area, including a call slip user interface for displaying telephone line state information; and
- a customizable area including at least one user interface element enabling a user to activate an internet browser application program to access an online directory service;
- wherein the software for implementing a customizable visual user interface comprises at least one application programming interface comprising one or more methods for customizing the customizable area, the at least one application programming interface provided by a shell program implementing default elements of the visual user interface; and
- wherein at least one of the one or more methods for customizing the customizable area is for adding one or more custom panes to the visual user interface for the telephony device, the one or more panes associated with a parent application separate from a the shell program implementing default elements of the visual user interface.

* * * * *